US012770352B2

(12) United States Patent
Bartczak et al.

(10) Patent No.: US 12,770,352 B2
(45) Date of Patent: Oct. 20, 2026

(54) EYE TRACKING ILLUMINATION

(71) Applicant: SeeTrue Technologies Oy, Joensuu (FI)

(72) Inventors: Piotr Bartczak, Joensuu (FI); Roman Bednarik, Joensuu (FI); Kristian Lukander, Joensuu (FI); Miika Toivanen, Joensuu (FI)

(73) Assignee: SeeTrue Technologies Oy, Joensuu (FI)

( * ) Notice: Subject to any disclaimer, the term of this patent is extended or adjusted under 35 U.S.C. 154(b) by 201 days.

(21) Appl. No.: 18/263,349

(22) PCT Filed: Jan. 27, 2022

(86) PCT No.: PCT/FI2022/050053
§ 371 (c)(1),
(2) Date: Jul. 28, 2023

(87) PCT Pub. No.: WO2022/162276
PCT Pub. Date: Aug. 4, 2022

(65) Prior Publication Data

US 2024/0428544 A1 Dec. 26, 2024

(30) Foreign Application Priority Data

Jan. 29, 2021 (FI) .................................... 20215098

(51) Int. Cl.
*G02B 27/00* (2006.01)
*G06V 10/14* (2022.01)
*G06V 40/19* (2022.01)

(52) U.S. Cl.
CPC .............. *G06V 10/14* (2022.01); *G06V 40/19* (2022.01)

(58) Field of Classification Search
CPC ...... G06V 10/14; G06V 40/19; G06V 10/141; G06V 10/145; G06V 10/147; G06V 40/18; G02B 27/0093; G06F 3/013; A61B 3/113; H04N 13/383
See application file for complete search history.

(56) References Cited

U.S. PATENT DOCUMENTS 8,487,838 B2 * 7/2013 Lewis .................. G02B 27/017 359/630
8,953,105 B2 * 2/2015 Kim ..................... H04N 13/351 349/61

(Continued)

FOREIGN PATENT DOCUMENTS

EP 3614193 A1 2/2020
WO WO2021050329 A1 3/2021

*Primary Examiner* — Philip P. Dang
(74) *Attorney, Agent, or Firm* — Laine IP Oy

(57) ABSTRACT

According to an example aspect of the present invention, there is provided an eye tracking apparatus comprising an illumination device comprising at least one light source, configured to illuminate a user's eye when the user is using the eye tracking apparatus, at least one detector configured to obtain information on the user's eye when the user is using the eye tracking apparatus, and at least one processing core configured to determine a direction of the user's gaze based on the information on the user's eye and based on an indication of place and/or orientation of the illumination device with respect to the at least one detector.

8 Claims, 7 Drawing Sheets

(56) References Cited

U.S. PATENT DOCUMENTS

| | | | | |
|---|---|---|---|---|
| 8,964,298 | B2 * | 2/2015 | Haddick | G02B 27/017 359/630 |
| 9,041,787 | B2 * | 5/2015 | Andersson | A61B 3/113 348/81 |
| 9,495,576 | B2 * | 11/2016 | Aoki | G06V 40/1312 |
| 10,222,474 | B1 * | 3/2019 | Raring | H01S 5/02212 |
| 10,310,597 | B2 * | 6/2019 | Biedert | H04R 1/32 |
| 10,419,655 | B2 * | 9/2019 | Sivan | G06F 3/012 |
| 10,451,895 | B2 * | 10/2019 | Macnamara | G02C 11/10 |
| 10,482,340 | B2 * | 11/2019 | Zeviar | G06V 10/75 |
| 10,686,972 | B2 * | 6/2020 | Rönngren | H04N 5/2628 |
| 10,716,469 | B2 * | 7/2020 | Krueger | A61B 3/112 |
| 11,042,034 | B2 * | 6/2021 | Sztuk | G02B 27/0172 |
| 11,506,887 | B2 * | 11/2022 | Bednarik | A61B 3/113 |
| 2011/0109880 | A1 | 5/2011 | Nummela | |
| 2012/0148116 | A1 * | 6/2012 | Chae | G06V 40/19 382/117 |
| 2013/0278631 | A1 * | 10/2013 | Border | G06F 3/04842 345/633 |
| 2015/0098620 | A1 | 4/2015 | Wu et al. | |
| 2015/0181206 | A1 * | 6/2015 | Kim | G02B 30/27 359/462 |
| 2017/0147859 | A1 * | 5/2017 | Zhang | G06T 7/70 |
| 2017/0322430 | A1 | 11/2017 | Fayolle et al. | |
| 2019/0138094 | A1 | 5/2019 | Miettinen et al. | |
| 2020/0326777 | A1 | 10/2020 | Shoushtari et al. | |

* cited by examiner

EYE TRACKING ILLUMINATION

FIELD

The present disclosure relates to gaze tracking, such as determining a direction in which a user's gaze is directed.

BACKGROUND

Determining what a user looks at is of interest in a number of different fields. For example, a disabled person may be equipped with a gaze tracker enabling her to input characters to form words and sentences. As another example, an ambulance driver may be enabled to safely operate equipment of his ambulance, or a nuclear power station operator may have his gaze tracked to detect episodes of fatigue during a shift.

Eye-tracking solutions on and for ocular devices such as microscopes, eye-glasses, wearable displays, binoculars, and viewfinders may depend on prior knowledge of a constant geometrical relationship between an eye-tracking sensor and an illumination of the eye. In some advanced 3-D based gaze point computation methods the mutual geometrical relationship is required to be known for the method to work. In such methods, the relationship between the illumination and the detector comprising sensors should not be changed during the operation, for example, by moving, shifting, rotating, or otherwise spatially or geometrically manipulating the detector and/or the illumination device of the gaze tracking apparatus.

SUMMARY

According to some aspects, there is provided the subject-matter of the independent claims. Some embodiments are defined in the dependent claims.

According to a first aspect of the present disclosure, there is provided an eye tracking apparatus comprising an illumination device comprising at least one light source, configured to illuminate a user's eye when the user is using the eye tracking apparatus, at least one detector configured to obtain information on the user's eye when the user is using the eye tracking apparatus, and at least one processing core configured to determine a direction of the user's gaze based on the information on the user's eye and based on an indication of place and/or orientation of the illumination device with respect to the at least one detector.

According to a second aspect of the present disclosure, there is provided a method comprising illuminating, using an illumination device of an eye tracker apparatus, a user's eye when the user is using the eye tracking apparatus, the illumination device comprising at least one light source, obtaining, using at least one detector, information on the user's eye when the user is using the eye tracking apparatus, and determining a direction of the user's gaze based on the information on the user's eye and based on an indication of place and/or orientation of the illumination device with respect to the at least one detector.

According to a third aspect of the present disclosure, there is provided an apparatus comprising means for illuminating, using an illumination device of an eye tracker apparatus, a user's eye when the user is using the eye tracking apparatus, the illumination device comprising at least one light source, obtaining, using at least one detector, information on the user's eye when the user is using the eye tracking apparatus, and determining a direction of the user's gaze based on the information on the user's eye and based on an indication of place and/or orientation of the illumination device with respect to the at least one detector.

According to a fourth aspect of the present disclosure, there is provided a non-transitory computer readable medium having stored thereon a set of computer readable instructions that, when executed by at least one processor, cause an apparatus to at least illuminate, using an illumination device of an eye tracker apparatus, a user's eye when the user is using the eye tracking apparatus, the illumination device comprising at least one light source, obtain, using at least one detector, information on the user's eye when the user is using the eye tracking apparatus, and determine a direction of the user's gaze based on the information on the user's eye and based on an indication of place and/or orientation of the illumination device with respect to the at least one detector.

According to a fifth aspect of the present disclosure, there is provided a computer program configured to cause a method in accordance with the second aspect to be performed.

EMBODIMENTS

In geometry, the orientation, angular position, attitude, or direction of an object such as a line, plane or rigid body is part of the description of how it is placed in the space it occupies. More specifically, it refers to an imaginary rotation that is needed to move the object from a reference placement to its current placement. A rotation may not be enough to reach the current placement. It may be necessary to add an imaginary translation, called the object's location, or place, or linear position, to the rotation. The place and orientation together fully describe how the object is placed in space. In detail, the place and orientation together may be referred to in brief as a geometrical relationship, such as between an eye-tracking sensor and the illumination device of the eye tracker apparatus.

In head-mounted versions of eye tracking the physical location of light sources illuminating the eye is typically fixed in the frame of the eye tracking apparatus, which rests on the user's head. In remote eye-tracking arrangements the same applies, as the light sources and sensor(s) are lodged into a non-movable frame and do not change their physical location nor geometrical relationship with regards to each other. However, in near-to-the eye gaze tracking applications, such as viewfinders and other ocular devices, the ocular device may need to be rotated, extended, bent or otherwise manipulated, which may result in changes to the geometrical relationship between the eye-tracking detector and the illumination device arranged to project light on the eye.

Based on methods disclosed herein, changes in the geometrical relationship between a detector comprising at least one eye-tracking sensor and the illumination device is detected and accounted for. A benefit is obtained in enhanced gaze tracking accuracy, as the geometrical changes do not to the same extent produce errors in gaze tracking results.

Figure 1:
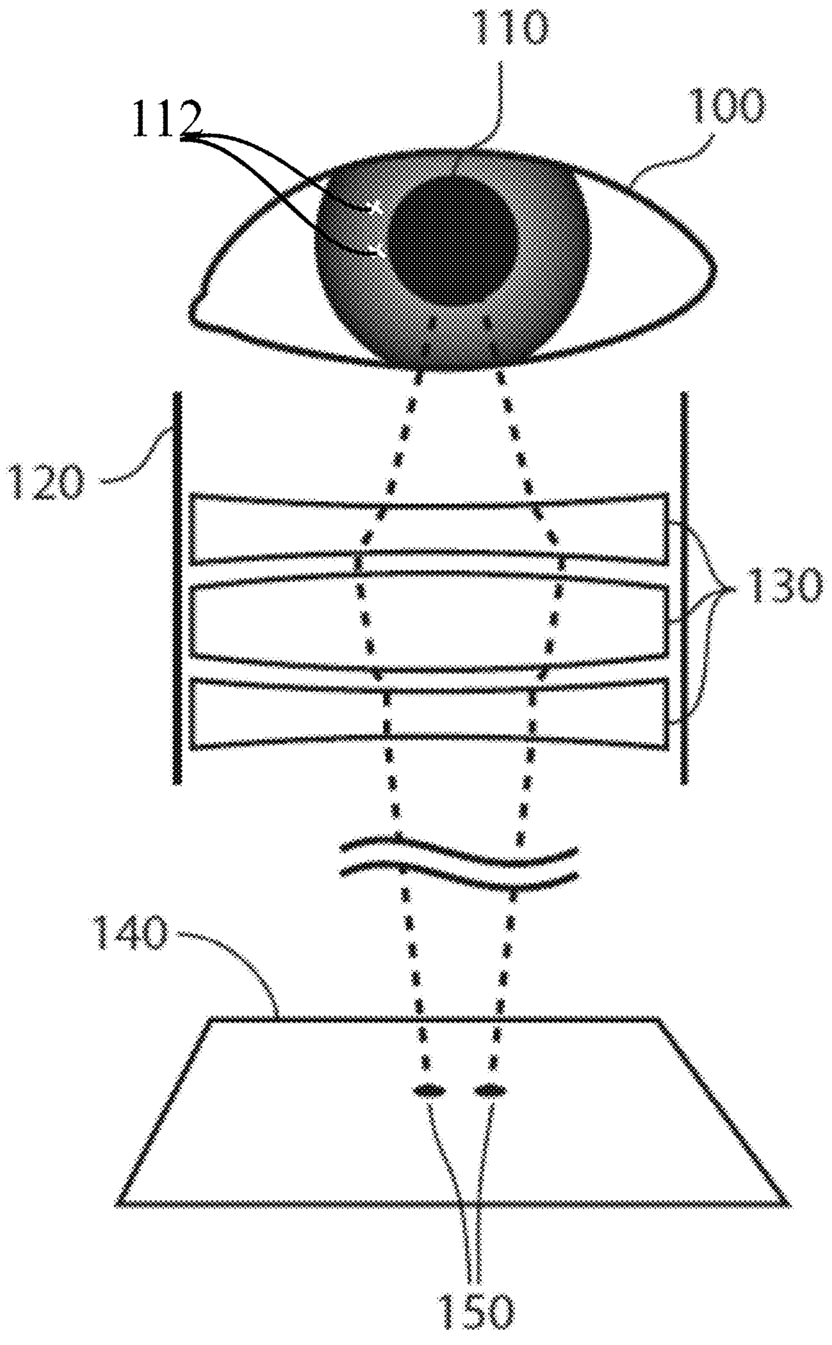
FIG. 1 illustrates an example system in accordance with at least some embodiments of the present invention.

FIG. 1 illustrates an example system in accordance with at least some embodiments of the present invention. FIG. 1 illustrates a schematic example system. Illustrated is a user's eye 100, which comprises the pupil 110 in black colour. In the example of FIG. 1, the user uses a microscope 120, which is an example of a near-eye ocular device, which is a near-to-eye optical device. Microscope enclosure 120 comprises a plurality of optical components such as, but not limited to, lenses, filters, beam splitters, reflectors, polarizers, prisms, light guides, display(s), reticle(s), a calibration grid and/or mirrors, which are schematically illustrated using reference number 130. Which optical components 130 are included depends on the application, for example a pathologist's microscope has a larger magnification requirement than a microscope designed to study entire insects, or numismatics. In the case of a night vision device, optical components 130 may comprise image intensifier components. A sample is visible through the microscope on plate 140. Plate 140 may be of glass, for example, enabling illumination of the sample from below. Two possible gaze targets 150 are schematically illustrated on plate 140.

Tracking the gaze of a user of a microscope gives valuable information concerning how the user observes the sample under study, for example which parts of the sample the user focuses on, for how long the user remains focused on each part of the sample and what kind of gaze strategy the user uses. Gaze information may also be used in controlling the functioning of an optical device, such as a microscope, for example. Thus the need for manual control may be reduced, freeing the user from operating another set of controls or manipulating other devices.

In addition, the pupil size may be estimated. This information may be used to estimate the pupillary response, the user's awareness, the user's workload and his level of expertise, in educational purposes, and in assisting annotation of image areas, for example. The relative pupil size may be inferred in image units, pixels, using the eye image alone, or in real-world units, for example square millimetres, by using the image of the eye and/or information provided by glints on the corneal surface, for example. Other features of the eyes, such as iris, iris colour and pattern, eyelids, eyelids characteristics, blink and blinks characteristics may also be estimated, for the purposes including, but not limited to, eye tracking, user state monitoring, and user identification. Glints 112 are illustrated in FIG. 1, they result from reflection of light originating from light sources in an illumination device of an eye tracking apparatus.

A pathologist or laboratory worker may also use his gaze point on a sample plate to guide the microscope to move the sample. As a further example, a digital viewfinder may provide a visual indication when the user is looking at a target which may be a human, for example when the ocular device in question is binoculars. Further, a sample may be automatically associated, based on the gaze point identification, with metadata indicating an extent to which it has been analysed, for example, whether a threshold has been reached.

Figure 6:
FIG. 6 illustrates an example system in accordance with at least some embodiments of the present invention.

In the system of FIG. 1, a detector comprising at least one sensor, such as, for example a camera or video camera sensor or other type of movement-sensing device, is configured to image eye 100. A detector may produce two-dimensional, 2D, or three-dimensional, 3D, data. A detector may comprise a spectral camera, a depth camera, one or more arrays of photosensitive sensors, a photosensitive sensor or its optics may be supported with an actuator or another controllable scanning solution such as, for example, a microelectromechanical, MEMS, solution for rapid positioning. The detector is not shown for the sake of clarity of the illustration (although the detector is depicted in FIG. 6). The detector may image eye 100 from below or from other orientations. The detector may be in enclosure 120 or outside enclosure 120, for example. The eye may be illuminated for this purpose by at least one light source, for example a source of visible light or infra-red, IR, or near-infrared light. The light source(s) may comprise light-emitting diodes, LEDs, and/or laser emitters, for example. In some cases, a light source may take the form of a lens, fibre or reflector providing light generated from a light emitter. In other words, having three light sources in an illumination device, for example, may comprise one LED and two lenses/mirrors arranged to convey light from the LED, such that overall the illumination device provides light from three places in the illumination device. An advantage of IR lights is that the human eye does not detect it, making the light unobtrusive to the user. IR light also allows for filtering out lighting and reflections of visible light sources the user is looking at or which are visible in the environment, helping to control the lighting scheme. An illumination device comprising the at least one light source may be in enclosure 120 or outside enclosure 120, for example. Enclosure 120 may have ports enabling light to be directed between the enclosure and an illuminating device and/or detector. Light may be directed to such ports by beam splitters along the axis of enclosure 120, for example. The corneal shape of the user's eye enables extracting information on the location and direction the eye is turned to, based on glints of the light emitted by the light source(s) on the surface of the eye. The detector is configured to produce data of the eye which characterizes locations of the glints. Such digital video or still image of the eye may include reflections, glints, of light emitted by the light source(s).

Likewise in the system of FIG. 1, a scene camera—not seen in the figure for the sake of clarity—may be arranged to image plate 140. The scene camera may be based on CCD or CMOS technology, for example, like the sensor(s) of the detector, to produce digital video or still image of the sample. The scene camera and the eye-tracking camera may be synchronized with each other to produce time-aligned images of eye 100 and plate 140. In some embodiments, the scene camera may be absent.

In gaze tracking in general, a transformation may be determined from a coordinate system of a detector to a coordinate system of the scene of a scene camera. The transformation may be initialized using a calibration procedure which produces calibration information. The detector may be assisted by the light sources to generate glints 112 and illuminate the eye, as described above, to enable determining a direction where the eye is turned toward. In an ocular device, the presence of optical equipment 130 may make it more difficult to accurately project a gaze point into a scene camera's coordinates. Further, if the geometrical relationship between the detector and the illumination device of the gaze tracking apparatus changes, the calibration information may need updating, or the gaze tracking may need to apply corrective measures to account for the change in the geometrical relationship. A change in the geometrical relationship may comprise a rotation of the detector and/or of the illumination device, and/or a translation, that is, a physical movement to another location, of the detector and/or of the illumination device.

In general, a gaze tracking apparatus may process an indication of place and/or orientation of the illumination device with respect to the detector. The apparatus may derive the indication in a processing core, and/or receive the indication from an illumination device. In some embodiments, the illumination device is comprised in the gaze tracking apparatus while in other embodiments the illumination device is not comprised in the gaze tracking apparatus. Processing the indication may comprise updating calibration information to account for the movement and/or rotation of the illumination device with respect to the detector. In some embodiments, the illumination device is configured to communicate the indication to the detector as information encoded on a light signal, for example amplitude modulated, such that the detector may receive the indication from observing how one or more glints on the user's eye develops over time.

An illumination device may be configured to derive the indication based on data obtained from the at least one of a position-detecting sensor, an acceleration sensor and a rotation-detecting sensor comprised in the illumination device. A rotation-detecting sensor may comprise an accelerometer and/or a gyroscope, such as a microelectromechanical MEMS circuit providing these functions, for example. The position-detecting sensor may comprise an electromagnetic multilateration device or an electromagnetic triangulation device, which may be configured to act responsive to electromagnetic beacon transmissions, for example electromagnetic beacons transmitted by other part(s) of the gaze tracking apparatus. The illumination device may determine it has rotated and/or moved based on outputs of these sensor(s), and the illumination device may provide an indication that describes this change in the geometrical relationship between the illumination device and the detector.

The indication of place and/or orientation of the illumination device with respect to the detector may be derived by identifying one from among plural light sources of the illumination device. Such identifying may be based on at least one physical characteristic of the light source, for example. More precisely, the indication may relate to the place and/or orientation of light sources comprised in the illumination device to the detector. Thus, glints reflected from the eye are detected in an image obtained by the detector of the eye, and then having knowledge of the physical location of the light sources of the illumination device, the problem of locating the eye (corneal sphere) and then the pupil may be solved.

Figure 2A:
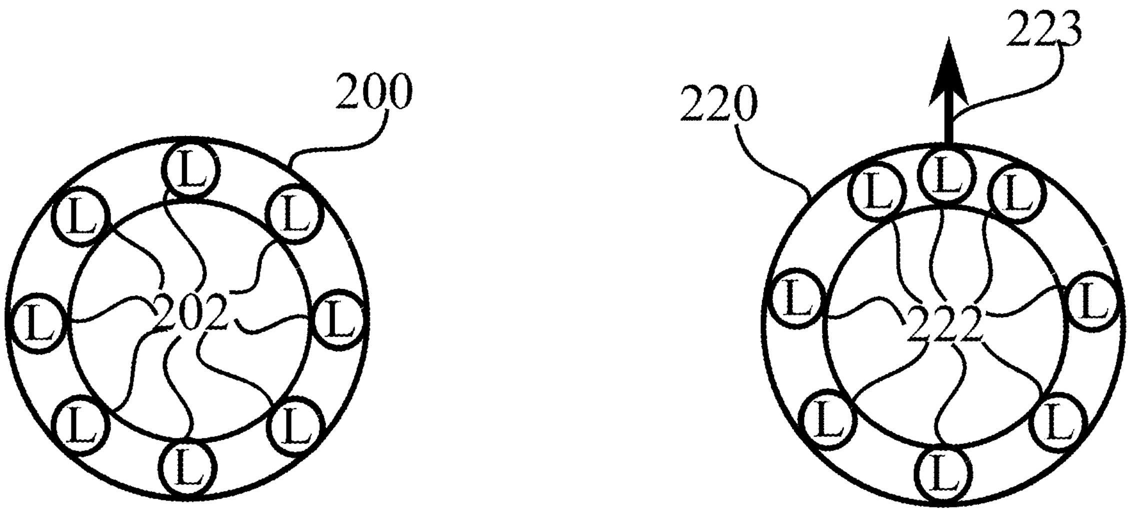
FIG. 2A illustrates an example illumination device in accordance with at least some embodiments of the invention.

The at least one physical characteristic of the at least one identified light source may comprise at least one of the following: a size of the light source, a shape of the light source, a spectrum feature of light emitted by the light source, a feature of temporal variance of light output by the light source and a feature of polarization of light output by the light source.

Where the physical characteristic comprises the size of the light source, a light source with a size different from the other light sources may define a direction of an axis, such as axis 223 of FIG. 2A, enabling determination of an extent of rotation of the illumination device. This is so, since one of the glints 224 in polygon 226 will be larger in size, singling out the direction of the axis.

Where the physical characteristic comprises a shape of the light source, a light source with a shape differing from shapes of other light sources may define a direction of an axis, such as axis 223 of FIG. 2A, enabling determination as to an extent of rotation of the illumination device. This is so, since one of the glints 224 in polygon 226 will have a shape different from the shapes of the other glints, or a predetermined shape, singling out the direction of the axis. For example, one of the light sources 222 may be square when the others are circular. As another example, one of the light sources may have an annular shape, while other light sources have a non-annular shape. The shape of the light source affects the shape of a glint resulting from that light source. When a predetermined shape is used, all the light sources may be of different shapes, the axis being determined by identifying one of the light sources as having the predetermined shape.

Where the physical characteristic comprises a spectrum feature of light emitted by the light source, the identified light source is configured to emit light with a different spectral characteristic from the other light sources, or light with a predetermined spectral characteristic. For example, the centre frequency may be offset from that of the other light sources, enabling the identification of this light source. The offset needs to be large enough to be detectable, wherefore all the light sources may be in the infra-red range, for example, with one of them merely in a slightly different point of the infra-red range. The same applies when the physical characteristic is a feature of polarization, in which case one of the light sources may emit light polarized in a different way from the other light sources, or polarized in a predetermined way. For example, one of the light sources may emit light which is not polarized whereas the others emit polarized light. Alternatively, one of the light sources may emit light polarized in a direction rotated with respect to the polarization of light emitted by the other light sources. When a predetermined spectrum feature or feature of polarization is used, all the light sources may emit light of different spectra or polarization, the axis being determined by identifying one of the light sources as having the predetermined spectrum feature or the predetermined feature of polarization.

Where the physical characteristic comprises a feature of temporal variance of light output by the light source, the identified light may be configured to vary its intensity as a function of time while other light sources maintain a constant- or a predefined pattern of intensity. Alternatively, at least one of the light sources may be configured to change the direction of its light beam as a function of time, while the others remain static. Alternatively, one of the light sources may in general be configured to vary or to modulate its light output in a predetermined manner.

In some embodiments, a physical characteristic of a light source is used together with a movement and/or rotation sensor of the illumination device, to obtain a higher accuracy for the indication. In these cases, the indication may be derived separately based on the physical characteristic of the light source and on the sensor of the illumination device, and then an average may be obtained for the rotation and/or movement indicated by these indications. The averaged rotation and/or movement may then be used to adjust the calibration information.

In some embodiments, the light source may take the shape of a single larger structural entity such as a continuous ring or other shape such as a square, triangle, etc. or a continuous larger surface of light such as a filled circle, square or triangle with equal or patterned illumination across its surface. This adds the benefit of detecting and extrapolating continuous surface reflections on top of the eye, with distinguishable features such as corners or the minimum/maximum extent of the shape in different directions for matching with physical features of the source of illumination. Such continuous features may be more robustly detected in circumstances where single point light sources or multiple sources even with the methods mentioned above may be challenging to track or identify.

Figure 2B:
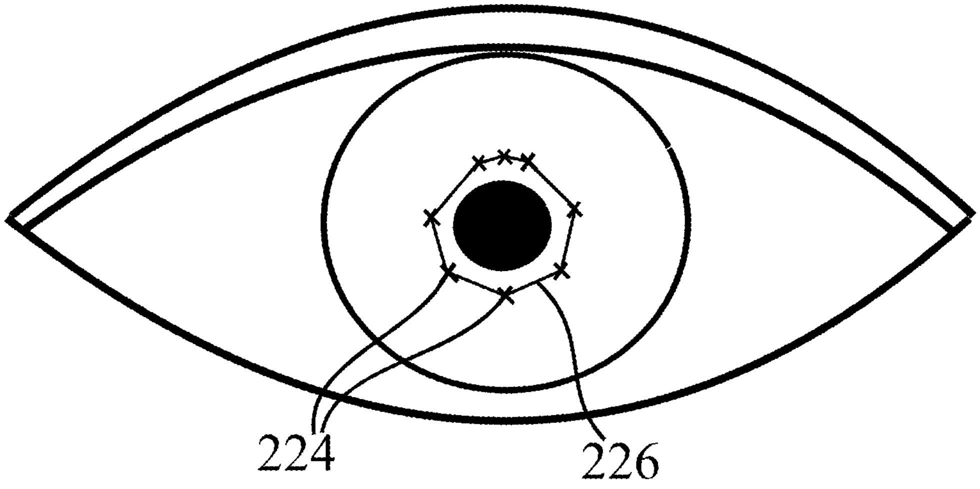
FIG. 2B illustrates an example image of an eye as illuminated by illumination device 220 of FIG. 2A.
Figure 2C:
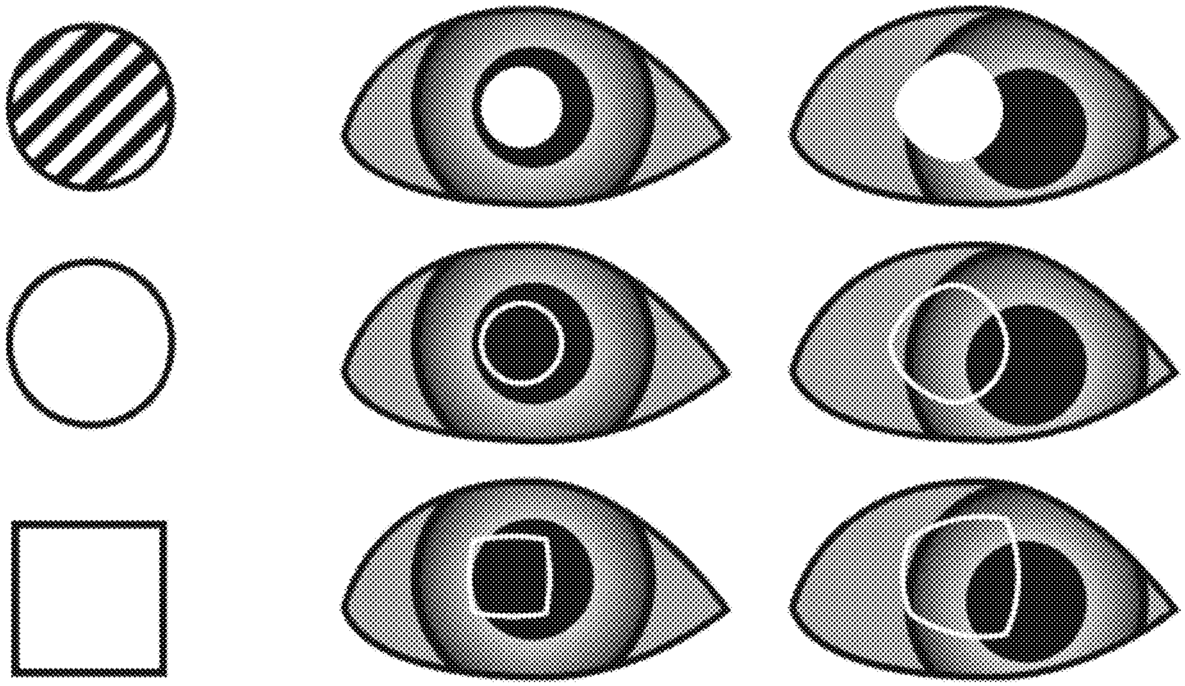
FIG. 2C illustrates examples of different illumination features in the form of larger structural entities.

FIG. 2C illustrates examples of different illumination features in the form of larger structural entities, namely, topmost, a large illuminanted circular area, in the middle a continuous circular ring, and, lowest, a square line luminant feature, and their schematic reflections on top of the cornea with the eye in different orientations, and the surface of the eye distorting the reflections in various manners. To be noted is that the shapes maintain their general form also in reflection, and features such as the minima and maxima, or corners can still easily be identified. These larger illumination features may be more than 3 millimetres in dimension, such as diameter, for example. In these embodiments, the shape of the glint is used to determine, at least in part, the indication of place and/or orientation of the illumination device with respect to the detector. This may be accomplished with reference to a pre-calculated table of glint shapes, for example, or by analytically matching the glint shape with a best fit for the of place and/or orientation of the illumination device with respect to the detector. The pre-calculated glint shapes may be obtained by performing a series of tests with different places/orientations of the illumination device with respect to the detector.

FIG. 2A illustrates an example illumination device in accordance with at least some embodiments of the invention. On the left is an illumination device 200 which has therein eight light sources 202. The light sources are arranged in illumination device 200 such that the distances between light sources 202 are constant. In detail, a closed path may be traversed along the detector, the light sources along the closed path, the distances between consecutive light sources along the closed path being equal.

On the other hand on the right is illumination device 220, which comprises eight light sources 222. Light sources 222 are arranged on illumination device 220 such that distances between light sources 222 vary. In detail, a closed path may be traversed along the illumination device, the light sources along the closed path, the distances between consecutive light sources along the closed path not all being equal. This enables determining whether the illumination device has rotated, as the denser arrangement of light sources 222 uniquely defines an axis 223, which may be determined visually based on glints from the light sources. In case axis 223 points in a different direction than before, illumination device 220 has been rotated.

An arrangement such as in illumination device 200 has been favoured in the past as it produces a uniform, smooth illumination of the eye. The arrangement of illumination device 220 also illuminates all aspects of the eye, additionally enabling determination of rotation based on axis 223.

FIG. 2B illustrates an example image of an eye as illuminated by illumination device 220 of FIG. 2A. In detail, a polygon 226 may be defined as a closed path traversing all the glints 224 observed. Rotation of the illumination device may be determined by deriving an estimate of axis 223 and comparing it to a previous estimate. The estimate of axis 223 may be derived based on the polygon 226 defined by glints 224. This is enabled by the uneven distribution of light sources 222 along illumination device 220.

It should be noted, that whereas FIGS. 2A and 2B use eight light sources, the axis 223 may be estimated using fewer light sources, as few as three, or more light sources than eight. In other words, the embodiments of FIGS. 2A and 2B are not limited to the example of exactly eight light sources.

Figure 3A:
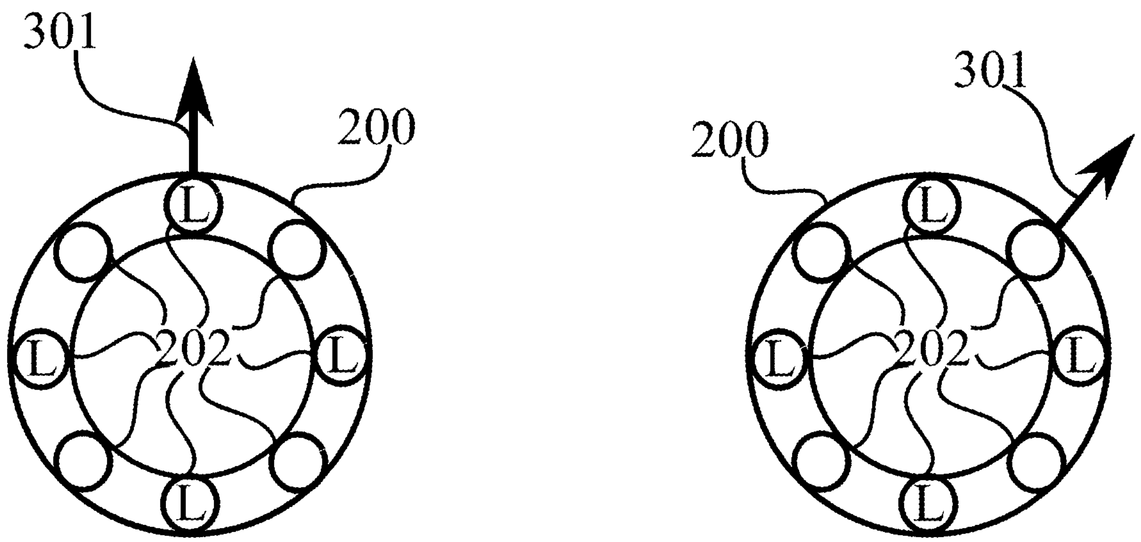
FIG. 3A illustrates an example illumination device in accordance with at least some embodiments of the present invention.

FIG. 3A illustrates an example illumination device in accordance with at least some embodiments of the present invention. Discussing first the device as pictured on the left, the illumination device 200 has eight light sources which may each be individually, selectably switched on or off. Four of the light sources are active in the figure, these light sources being denoted in the figure with the letter "L". Moving to the right, the illumination device has been rotated such that axis 301 is offset by about 45 degrees compared to the situation on the left. An inertial sensor of the illumination device, such as a gyroscope, has detected this rotation and re-programmed the light sources, such that the light sources which were active on the left in the initial position are switched off and their neighbouring light sources, in the counter-clockwise direction, have been switched on. The illumination pattern generated by the illumination device has remained constant despite the rotation, as the switching of the light sources has counteracted the effect of the rotation. To enable a more accurate effect, more light sources than the illustrated eight may be used, for example 32, 64 or 128 light sources might be employed. In general, the gaze tracking apparatus may be configured to respond to a detection of a rotation of the illumination device by switching the light sources to create an effectively rotation-invariant illumination pattern. The detection of the rotation may be obtained by a rotation-sensitive sensor, for example, as described above. In some embodiments, an intermediate board with physical connectors is employed to maintain active light sources of a preselected pattern, such that rotation of the illumination device has no, or little, effect on the illumination pattern produced by the illumination device. Thus illumination device position need not be detected, since the illumination device itself maintains its output at a more or less constant pattern.

Figure 3B:
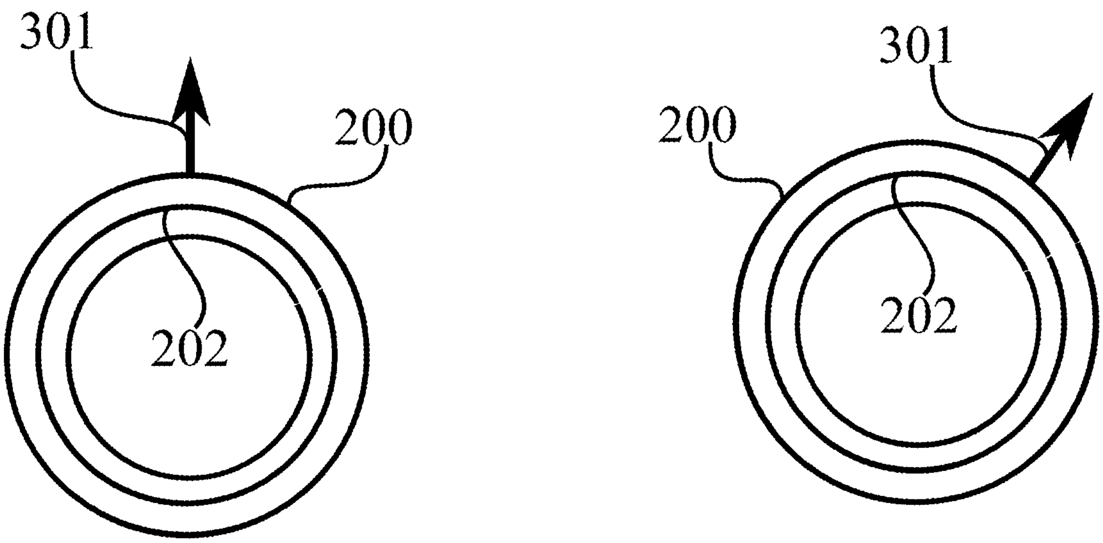
FIG. 3B illustrates an example illumination device in accordance with at least some embodiments of the present invention.

FIG. 3B illustrates an example illumination device in accordance with at least some embodiments of the present invention. In this embodiment, the illuminating device comprises one or more circular-shaped light sources 202. When there are more than one such light source, they may be arranged concentrically in the illumination device. As can be seen from the rotation, visible from the direction of axis 301 on the left and on the right of FIG. 3B, this light source is of a shape which is invariant to rotation, wherefore it need not be re-programmed responsive to a rotation of the illumination device 200. The illumination device may have a rotation-sensitive sensor, such as a gyroscope, such as a MEMS gyroscope, to determine that a rotation has taken place and to derive the indication thereof as a response to the rotation. In some embodiments, the illumination device comprises two circular-, or other geometrically shaped light sources 202, such that a smaller one of the circular- or other geometrically shaped light sources is disposed inside the larger one in a non-concentric manner, thus enabling determination of an extent of rotation of the illumination device.

Figure 3C:
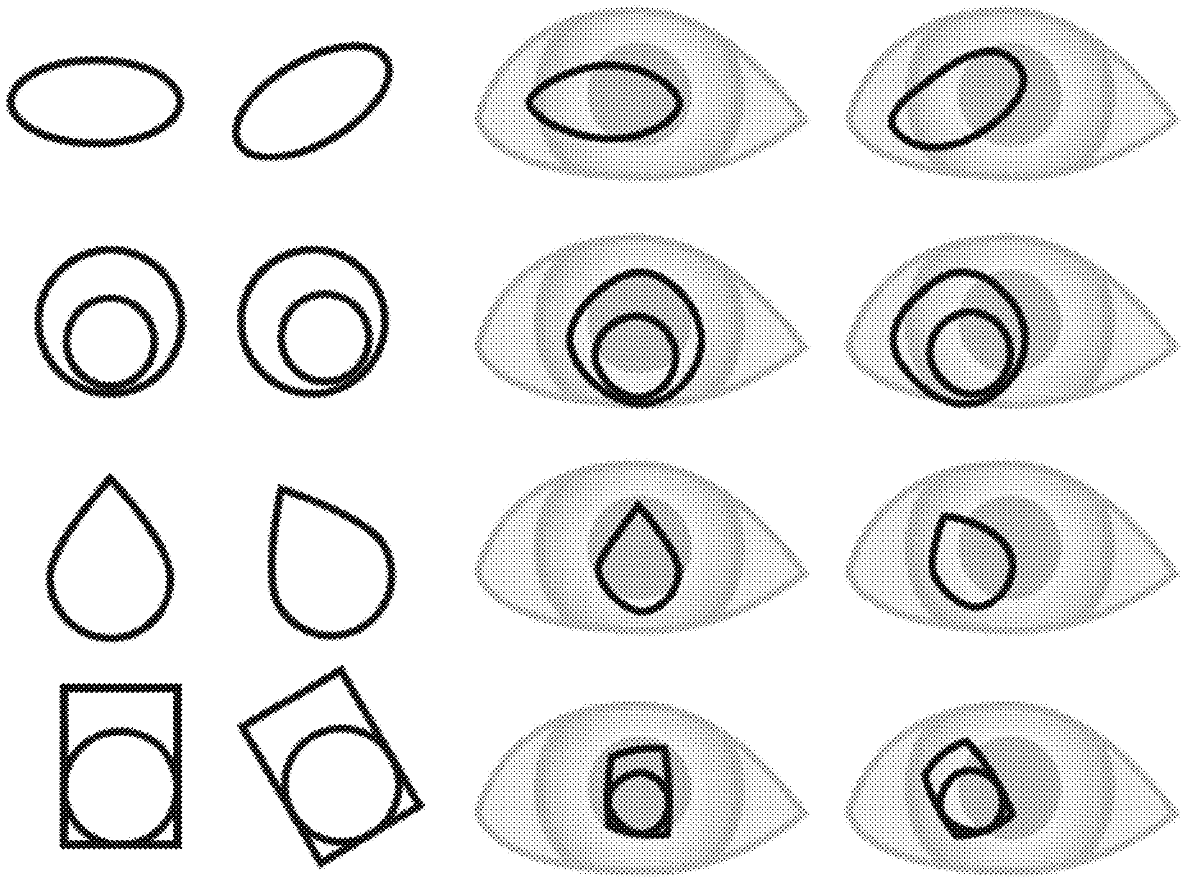
FIG. 3C illustrates examples of non-symmetric and non-concentric illumination features.

FIG. 3C illustrates examples of non-symmetric and non-concentric illumination features schematically represented in two orientations, zero (0) and thirty (30) degrees counter-clockwise, whose properties allow for distinguishing the same orientation in their reflections on top of the eye, even while the surface of the eye may distort the figures. These illumination features may have a greatest dimension of at least three millimetres, for example. As a direction may be determined from the glints, a rotation of the illumination device may be measured based on determining an extent of rotation of the glint.

Figure 4:
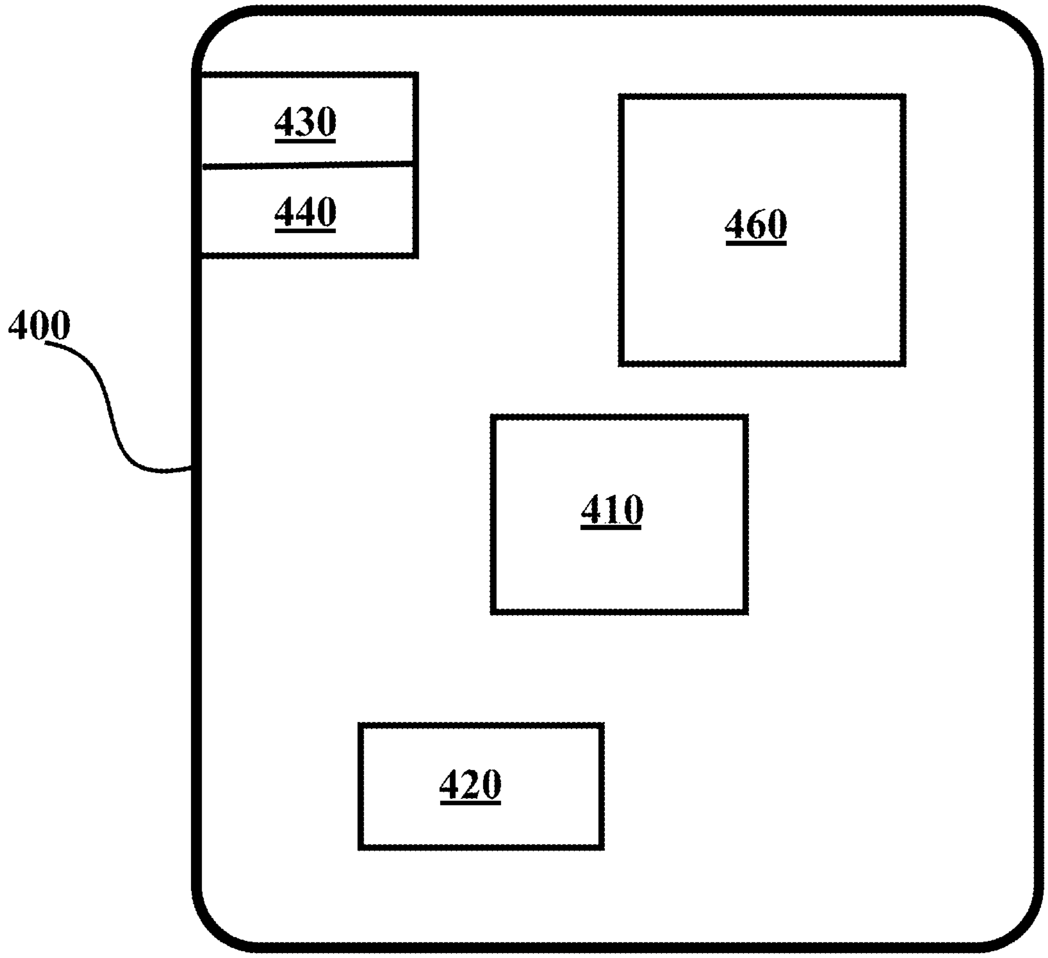
FIG. 4 illustrates an example device in accordance with at least some embodiments of the present invention.

FIG. 4 illustrates an example device in accordance with at least some embodiments of the present invention. Illustrated is device 400, which may comprise, for example, gaze tracking apparatus. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core designed by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400, such as illuminating, obtaining and determining, for example. Processor 410 may be configured, at least in part by computer instructions, to perform actions.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be a means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with a predetermined protocol.

Device 400 may comprise user interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to inspect samples on a microscope.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. In some embodiments, device 400 lacks at least one device described above.

Processor 410, memory 420, transmitter 430, receiver 440, and/or UI 460 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the present invention.

Figure 5:
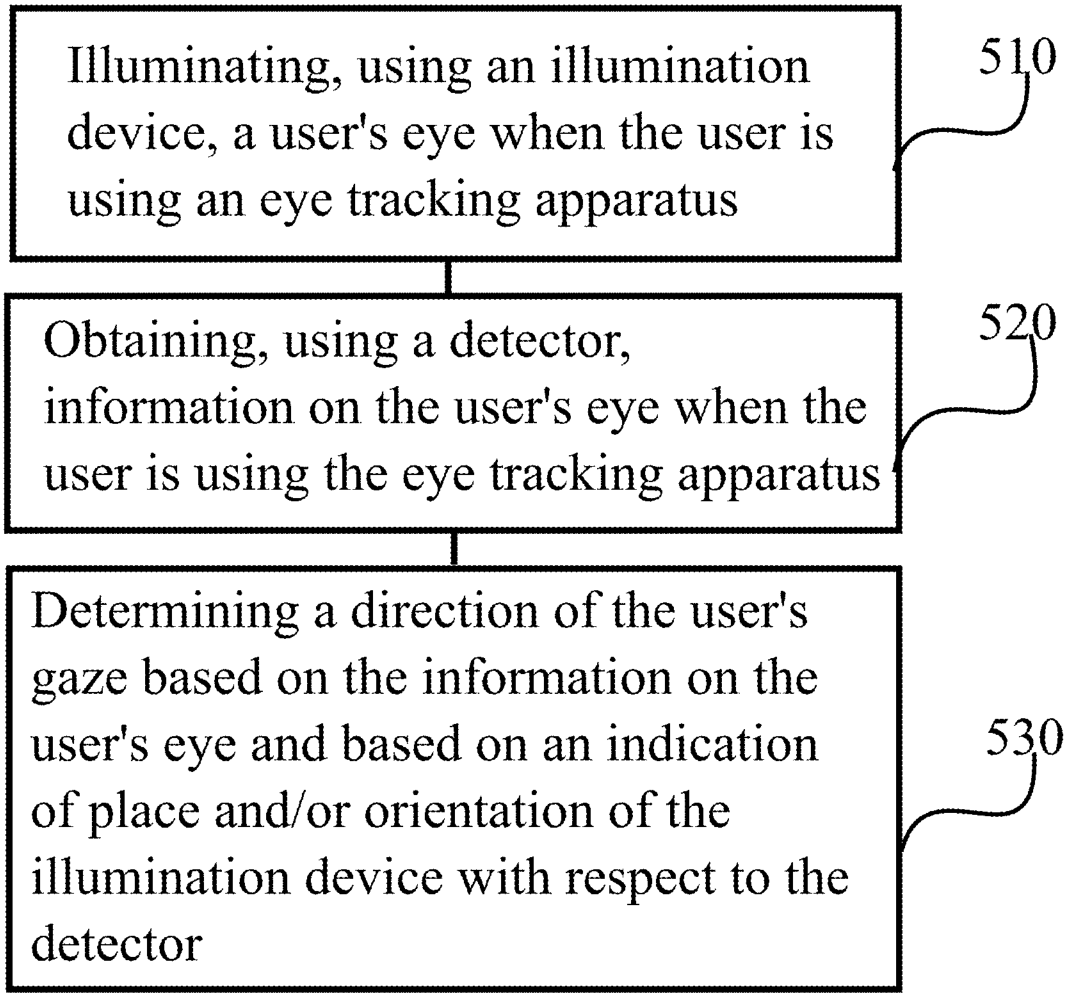
FIG. 5 is a flow graph of a method in accordance with at least some embodiments of the present invention.

FIG. 5 is a flow graph of a method in accordance with at least some embodiments of the present invention. The phases of the illustrated method may be performed in device 400, for example, or in a control device configured to control the functioning thereof, when installed therein.

Phase 510 comprises illuminating, using an illumination device of an eye tracker apparatus, a user's eye when the user is using an eye tracking apparatus, the illumination device comprising at least one light source. Phase 520 comprises obtaining, using a detector, a information on the user's eye when the user is using the eye tracking apparatus. Finally, phase 530 comprises determining a direction of the user's gaze based on the information on the user's eye and based on an indication of place and/or orientation of the illumination device with respect to the detector of the eye tracker apparatus. The information on the user's eye may comprise an image of the user's eye. The indication of place and/or orientation of the illumination device with respect to the detector of the eye tracker apparatus may indicate a change in the place and/or orientation of the illumination device with respect to an original orientation, for example. The determining of the direction of the user's gaze may comprise reading the current geometry and referencing a pre-calculated table of shapes and/or solving equations concerning shape in real time.

FIG. 6 illustrates an example system in accordance with at least some embodiments of the present invention. Illustrated is detector 610, which comprises at least one sensor 620. Further illustrated is at least one processing core 630, which is configured to determine a direction of the user's gaze based on indication 640 of place and/or orientation of the illumination device with respect to the at least one detector It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in gaze tracking applications, for example with ocular devices.

ACRONYMS LIST

LED light emitting diode

MEMS microelectromechanical

REFERENCE SIGNS LIST

| | |
|---|---|
| 100 | Eye |
| 110 | Pupil |
| 112 | Glints |
| 120 | Microscope |
| 130 | Optical elements |
| 140 | Plate |
| 150 | Gaze targets |
| 200, 220 | Illumination device |
| 202, 222 | Light sources |
| 223, 301 | Axis |
| 224 | Glints |
| 226 | Polygon |
| 400-460 | Structure of the device of FIG. 4 |
| 510-530 | Phases of the method of FIG. 5 |

The invention claimed is:

1. An eye tracking apparatus comprising:

an illumination device, configured to illuminate a user's eye when the user is using the eye tracking apparatus;

at least one sensor configured to obtain information on the user's eye when the user is using the eye tracking apparatus, and at least one processing core configured to determine a direction of a user's gaze based on the information on the user's eye and based on an indication of a place and an orientation of the illumination device with respect to the at least one sensor, wherein the at least one processing core is configured to determine the indication based on the information on the user's eye, wherein either:

A) the illumination device comprises at least three light sources disposed in the illumination device such that distances between consecutive ones of the at least three light sources are not equal, enabling determination of the orientation of the illumination device based on glints of the at least three light sources on a surface of the user's eye, or B) the illumination device comprises at least two light sources, the light sources comprising light sources of different size and/or shape, enabling determination of the orientation of the illumination device based on glints of the light sources on a surface of the user's eye, wherein the at least one processing core is configured to receive the indication from the illumination device, the illumination device comprising at least one of a position-detecting sensor, an acceleration sensor and a rotation-detecting sensor.

2. The eye tracking apparatus according to claim 1, wherein the rotation-detecting sensor comprises a gyroscope.

3. The eye tracking apparatus according to claim 1, wherein the position-detecting sensor comprises an electromagnetic multilateration device or an electromagnetic triangulation device.

4. The eye tracking apparatus according to claim 1, wherein the at least one processing core is configured to derive the indication based on identifying at least one of the light sources based on at least one physical characteristic of the at least one identified light source.

5. The eye tracking apparatus according to claim 4, wherein the at least one physical characteristic of the at least one identified light source comprises at least one of the following: a size of the light source, a shape of the light source, a spectrum feature of light emitted by the light source, a feature of temporal variance of light output by the light source and a feature of polarization of light output by the light source.

6. A method comprising:

illuminating, using an illumination device of an eye tracker apparatus, a user's eye when the user is using the eye tracking apparatus, the illumination device comprising at least one light source;

obtaining, using at least one detector, information on the user's eye when the user is using the eye tracking apparatus, and determining a direction of the user's gaze based on the information on a user's eye and based on an indication of a place and an orientation of the illumination device with respect to the at least one detector, wherein the method comprises determining the indication based on the information on the user's eye, wherein either:

A) at least three light sources are disposed in the illumination device such that distances between consecutive ones of the at least three light sources are not equal, enabling determination of the orientation of the illumination device based on glints of the at least three light sources on a surface of the user's eye, or B) the illumination device comprises at least two light sources, the light sources comprising light sources of different size and/or shape, enabling determination of the orientation of the illumination device based on glints of the light sources on a surface of the user's eye, wherein method further comprises receiving the indication from the illumination device, the illumination device comprising at least one of a position-detecting sensor, an acceleration sensor and a rotation-detecting sensor.

7. The method according to claim 6, wherein the rotation-detecting sensor comprises a gyroscope.

8. A non-transitory computer readable medium having stored thereon a set of computer readable instructions that, when executed by at least one processor, cause an apparatus to at least:

illuminate, using an illumination device of an eye tracker apparatus, a user's eye when the user is using the eye tracking apparatus, the illumination device comprising at least one light source;

obtain, using at least one detector, information on the user's eye when the user is using the eye tracking apparatus, and determine a direction of a user's gaze based on the information on the user's eye and based on an indication of a place and an orientation of the illumination device with respect to the at least one detector, wherein the instructions comprise determining the indication based on the information on the user's eye, wherein either:

A) at least three light sources are disposed in the illumination device such that distances between consecutive ones of the at least three light sources are not equal, enabling determination of the orientation of the illumination device based on glints of the at least three light sources on a surface of the user's eye, or B) the illumination device comprises at least two light sources, the light sources comprising light sources of different size and/or shape, enabling determination of the orientation of the illumination device based on glints of the light sources on a surface of the user's eye, wherein the set of computer readable instructions, when executed, further cause the apparatus to receive the indication from the illumination device, the illumination device comprising at least one of a position-detecting sensor, an acceleration sensor and a rotation-detecting sensor.

* * * * *